(12) United States Patent  
Fam

(10) Patent No.: US 11,884,187 B2  
(45) Date of Patent: Jan. 30, 2024

(54) ADJUSTABLE CHILD RESTRAINT SYSTEM

(71) Applicant: Flora K. Fam, Orlando, FL (US)

(72) Inventor: Flora K. Fam, Orlando, FL (US)

(*) Notice: Subject to any disclaimer, the term of this patent is extended or adjusted under 35 U.S.C. 154(b) by 126 days.

(21) Appl. No.: 17/301,876

(22) Filed: Apr. 16, 2021

(65) Prior Publication Data

US 2021/0323451 A1 Oct. 21, 2021

Related U.S. Application Data

(60) Provisional application No. 63/010,921, filed on Apr. 16, 2020.

(51) Int. Cl.
*B60N 2/28* (2006.01)
*H04R 1/08* (2006.01)
*G10L 15/22* (2006.01)

(52) U.S. Cl.
CPC .......... *B60N 2/2812* (2013.01); *B60N 2/2851* (2013.01); *B60N 2/2872* (2013.01); *B60N 2/2875* (2013.01); *G10L 15/22* (2013.01); *H04R 1/08* (2013.01); *B60N 2002/2815* (2013.01); *B60N 2002/2896* (2013.01)

(58) Field of Classification Search
CPC .......... B60N 2/2812; B60N 2002/2815; B60N 2002/2896; B60N 2/885; B60N 2/879; B60N 2/2872; B60N 2/2875; B60N 2/2851; B60N 2/002; G10L 15/22; H04R 1/08
USPC ................................ 297/393, 256.13, 216.11
See application file for complete search history.

(56) References Cited

U.S. PATENT DOCUMENTS

| | | | |
|---|---|---|---|
| 6,739,659 B2 | 5/2004 | Dukes | |
| 7,284,792 B1 | 10/2007 | Dabney et al. | |
| 9,463,805 B2 | 10/2016 | Kirsch et al. | |
| 9,867,480 B2 | 1/2018 | Doering et al. | |
| 9,969,304 B2 | 5/2018 | Johnson et al. | |
| 2006/0061186 A1* | 3/2006 | Funke, III | B60N 2/882 297/393 |
| 2007/0085394 A1* | 4/2007 | Yang | B60N 2/28 297/250.1 |
| 2008/0100109 A1 | 5/2008 | Frank | |
| 2009/0179469 A1* | 7/2009 | Bass | B60N 2/2884 297/216.12 |
| 2012/0280540 A1 | 11/2012 | Pedraza et al. | |
| 2016/0207497 A1 | 7/2016 | Seal et al. | |
| 2017/0182914 A1* | 6/2017 | Lonstein | A47D 1/0081 |
| 2017/0206767 A1 | 7/2017 | Eyring et al. | |

(Continued)

FOREIGN PATENT DOCUMENTS

| | | |
|---|---|---|
| CN | 206690919 | 12/2017 |
| DE | 102007011722 | 9/2008 |

(Continued)

*Primary Examiner* — Milton Nelson, Jr.
(74) *Attorney, Agent, or Firm* — Wolter VanDyke Davis PLLC; Erica M. Cipparone

(57) ABSTRACT

In at least one embodiment, an adjustable child restraint system is provided. The system may include a base portion, a child retaining portion, a sensor, and a controller operatively connected to the base portion and/or the child retaining portion, the controller for operating movement of the base portion and/or the child retaining portion, in some embodiments. The child retaining portion may include a first expandable section and a second expandable section to operatively expand to support a head and neck of a child seated there within.

12 Claims, 2 Drawing Sheets

(56) References Cited

U.S. PATENT DOCUMENTS

2018/0082563 A1    3/2018  Cristella et al.
2021/0221328 A1*   7/2021  Naeem .................. B60R 25/403

FOREIGN PATENT DOCUMENTS

GB        2546727          2/2017
JP         2019073242 A  *  5/2019
KR        20130044913      5/2013
WO        2009/141814     11/2009

* cited by examiner

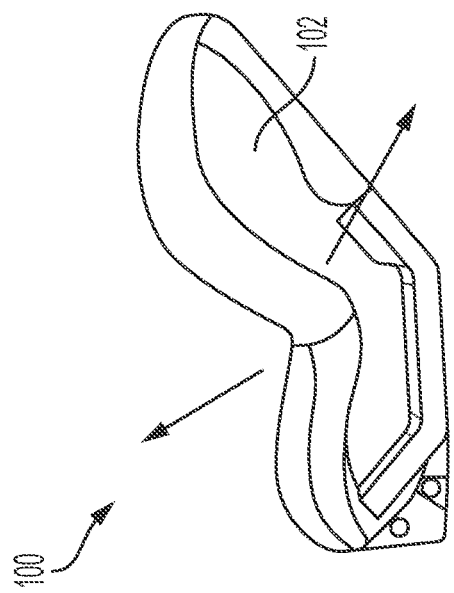
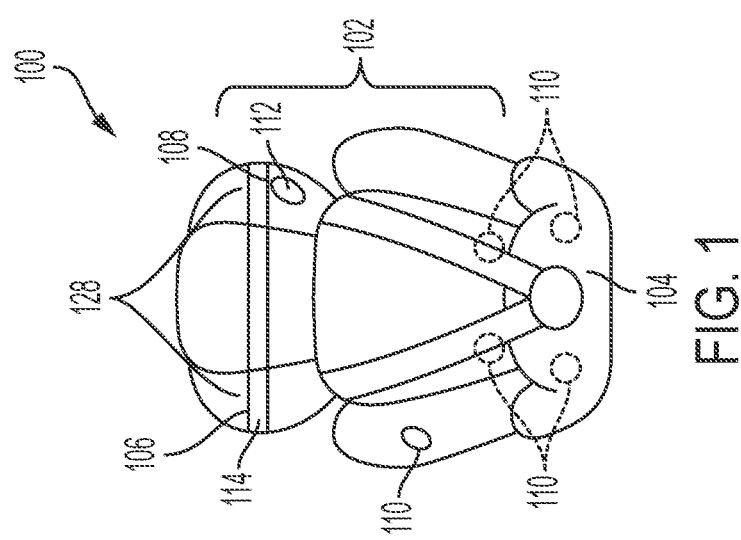

ADJUSTABLE CHILD RESTRAINT SYSTEM

BACKGROUND

Child restraint systems are often rigid and uncomfortable for their passengers. Children often fall asleep while in moving vehicles, causing strain on their necks due to relaxation of the muscles and placement of their heads. Most child restraint systems are manually adjustable, requiring the user to park the vehicle in order to adjust the system. Improvements in child restraint systems are necessary to support a more comfortable ride for children, and to prevent injury.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not, therefore, to be considered to be limiting of its scope, the embodiments will be described and explained with additional specificity and detail through the use of the accompanying drawings in which:

FIG. 1 provides a front side view of an embodiment of an adjustable child restraint system.

FIG. 2 is a side view of the embodiment of the adjustable child restraint system shown in FIG. 1 with arrows demonstrating the adjustability of the vertical back support.

DETAILED DESCRIPTION

Figure 4:
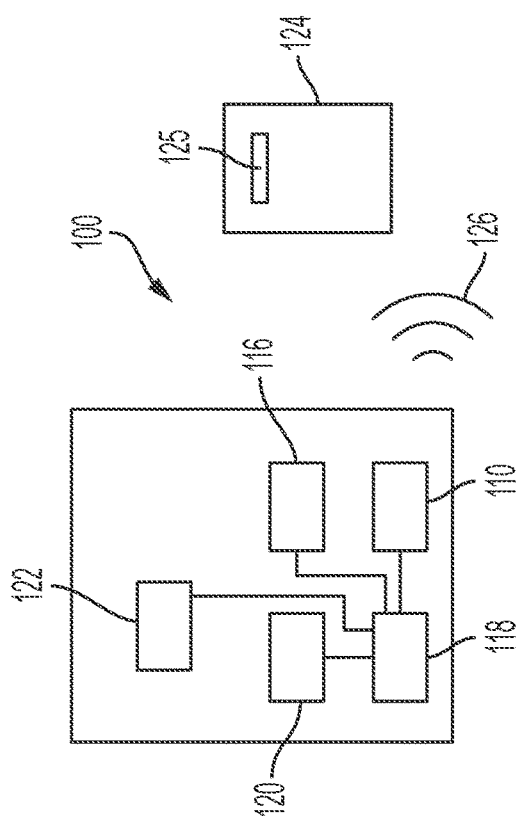
FIG. 4 is a schematic view of the system including a remote controlling apparatus.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7.

In some embodiments, the systems described herein can provide ease of adjustability of a child restraint system, and ease of use to a user by providing automated adjustable features of the child restraint system, sensing intelligence, and/or an interactive user interface. Such features can help provide a child seated in the system with a comfortable riding experience while maintaining the safety of the child seated therewithin throughout the ride. Moreover, the systems may provide notifications to a user through various possible outputs as will be described in greater detail herein.

In an embodiment, the child restraint system may include a base portion and a child retaining portion, the base portion and child retaining portion may be formed as one unit, in one example, or in multiple components, removably attached to one another, in another example. In one embodiment, the system includes a controller operatively connected thereto. The controller may, optionally, be located in the base portion, or the seat portion, or in the vehicle, in non-limiting examples. The controller may be used to operate movement of the system and its components as selected by the user. The child retaining portion and the base portion may communicate by wired or wireless connection.

The controller may optionally be provided in or associated with the base portion, and may provide the connectivity settings for the system. In one embodiment, one of the smart features the system offers to end users is the ability to choose between various WIFI & Bluetooth connectivity options to operate movement and voice commands. The controller allows end user to tailor any command or feature manually or through voice commands. In order for the voice command option to be functional for communication to be established a user must establish connection through wireless WIFI or Bluetooth for wireless competitivity or through wired connection plugs into OBDII or (lighter) plug, for example. Though the child restraint includes various features to ensure safety, comfortability to the child retained therewithin, and the driver; there is a manual release button on the physical restraints to allow adult users to push to release the restraint and allow child's removal from the seat when needed, either through daily use or emergency use in case of an impact, in one non-limiting embodiment.

In an embodiment, the system may be designed to tailor seating and positioning based on the passenger's age and weight group, it can accommodate passengers who weight approximately 4 lbs. to 72 lbs. or newborns to 6 years of age. In addition, the setting allow end users to configure comfort level for children who are in higher weight or heights percentiles. Such settings are configured though the initial settings as well as ability to modified through the application or base controller or by manually de-attaching the upper portion and replacing it with the booster seat portion for older children. Chair positioning can be done through a remote controller, the application or through the back and front buttons on the child restraint system. A reset to normal or sleep programmed positions are an option to ensure passenger is placed in the right position based on the current whenever entering the vehicle. For instance, the passenger might be in a reclined position whenever extracted from vehicle but upon their return passenger is awake or vice versa; this feature ensures positioning levels are well configured before placing the passenger maximizing child's comfort and avoiding disruption efforts.

The child retaining portion may include a forward or rear-facing car seat, removable or permanently placeable within a vehicle, configured to receive a child from premature size, including a weight of 4 to 72 lbs.

In an embodiment wherein the child retaining portion and the base portion are removably attachable to one another, the base portion may be secured in a vehicle with clips or a vehicle seat belt as known in the art, and the child retaining portion may be moveable relative to the base portion. Therefore, in some non-limiting examples, the base portion may be used without the child retaining portion as a booster seat for older children, or children of greater heights and weights. Once affixed to the base portion, the child retaining portion may be adjustable relative to the base portion. The child retaining portion may be movable between an upright position and a reclined position at any point in time, before, during or after placement of a child within the child retaining portion. The movement of the child retaining portion may be initiated from a signal from the controller, in one embodiment.

The child restraint system may further include one or more sensors. The one or more sensors may be provided on the base portion, on the child retaining portion, or a combination thereof. The one or more sensors may be used to detect position of the base portion and/or the child retaining portion relative to one another, for example. In another example, the one or more sensors may be used to detect movement or non-movement of a child within the seat. The sensors may also be able to detect physiological parameters of the child within the child retaining portion. The one or more sensors may include a motion sensor, contact sensor, proximity sensor, light sensor, orientation sensor, temperature sensor, gyroscope, GPS sensor, acoustic sensor, airflow sensor, hall effect sensor, pressure sensor, oxygen sensor, vibration sensor, vehicle speed sensor, breathalyzer, and other sensors known in the art.

The system may further include a signal output component, configured to provide a visual, audio, gustatory, olfactory, or tactile output to a user. The system may also include a microphone, wherein the microphone may be configured to receive input from a user, including, for example, instructions or commands for adjusting the system. The system may translate these commands or instructions into signals to operate the controller of the system. A signal output component may be disposed on the system, or in a vehicle, or on a remote device or apparatus configured to receive communications from the system. The signal output component, for example, may include the vehicle speakers. In another example, a visual light or screen may provide an output from the system. Various notifications may be provided through the signal output device, including, but not limited to, the position of the components of the system, the temperature of the system and/or the child seated therewithin, or the movement or lack of movement of the child seated within the child restraint portion. Temperature and oxygen levels intelligent sensors monitor passenger's oxygen and temperature levels ensuring comfort and safety maximization. Temperature and Oxygen alerts will be sent and shared with the user(s) of the system.

The signal output component, when disposed on the system may be used to play music from the child restraint system. This music may differ from music played throughout the car speakers, and the volume and music selection may be selected directly on the system by manual selection, or by wireless selection through the vehicle, or a cellular phone application, for example. The volume of the speakers on the system may have a limit to prevent destruction to the listener's ears.

User interaction for input & output commands components may be accomplished through the voice recognition through a phone or vehicle application, vehicle speakers, and visualization is also available the application or car screen audio system. Output music interaction allows the user to play selected music from the system; this may differ from music that is played from the vehicle system through the vehicle speakers. Volume and track selections can be done through the application or through forward and backward commands on the car audio system, or through the system, or alternatively, via the in-vehicle controls.

A built in microphone within the system to process voice commands, this feature allows user to utilize the vehicle's microphone Bluetooth as well as the system at the same time or independently. The system may further include a timer to enable detection of movement or lack thereof, over time and alert the user of the system that a child seated therewithin may be asleep. The system may alert a user, such that the child restraint portion may be reclined to a more comfortable position to allow the child to remain asleep and prevent bobbing movement of the head once the muscles of the neck and head relax during sleep. The movement, or lack thereof, of the child within the safety restraint system can be determined by a motion sensor, in one non-limiting embodiment, such that when a child ceases movement, the user can be alerted that the child has stopped moving. In another non-limiting embodiment, the child restraint system may alert a user when the child has ceased movement for a predetermined period of time, based on both input from a sensor, for example, a motion sensor, and a timer.

Whereas most other car seats offer a fairly limited number of positions for recline adjust, if any at all, the embodiments described herein potentially have an infinite number of positions. This may be achieved via a drive system such as, but not limited to, a linear screw drive mechanism wherein the screw used can have acme, standard, or any other type of thread profile used in lead screws. In another embodiment, the base can also be leveled so that when the child restraint portion is coupled to the base portion, the child restraint portion is at an appropriate and safe angle. In some examples, the screw may be driven by a motor and transmission, like a DC motor actuator and a gearbox. Upon adjusting the child restraint portion to the intended position, the child restraint portion angle may be locked into place. Safety locks may be used to maintain the child restraint in its intended position. A built in or attachable level may be used to correctly position and level the base portion of the car seat. The safety locks may be remotely controlled in non-limiting embodiments, or may be time-sensitive locks automatically unlocked upon expiration of a predetermined time period.

The system includes a motion sensing, calculating, and intelligent learning component to sense, calculate and learn the type and number of movements during the usage of the system. This sensing intelligence feature can automatically be set to adjust the car seat to tilt the car seat backwards to accommodate and support child's head and neck upon either sensing the tilt is needed by way of detection via the sensors, or based on prior manual user-directed settings in prior uses of the system. Alerts may be sent to users when motion is not detected for a predetermined timeframe. Setting up of this feature can be set to configured as follows, for example: a) Manually: the app user can configure tilting angles manually through the App or Voice Command; b) Automatically: Once steady movement has been dedicated, the car seat will automatically tilt/adjust the back portion of the seat to the desired angle preset by user; c) Manually & Automatically: This option empowers the user to set a preference to of angle changes. For instance preference can be set as "Automatic Adjustment"; however the command cannot be implemented without a confirmation from the user. For any of the configurations provided in a-c above, a user interface feature will provide an alert to the user of a current passenger's position and confirmation of an updated angle position before, during, or after adjustment has been completed.

The system embodiments may be powered by one or more energy sources within or external to the vehicle. The system may also include an energy source such as a main battery for supplying power to the various systems, and a controller and/or monitor for determining a power level of the battery or other energy source. Optionally, the battery monitor can be configured to prevent the controller from installing the child restraint portion to the base portion when the power level is below a predetermined level. The power may be supplied through a direct connection to the vehicle power such as, for example, through a direct current device, such as a USB connector, OBD II port, or a "cigarette lighter" connection. The system may further include a back-up battery to be used if the main battery is expended. The system can be charged through electric outlets; this option will allow the battery to be charged and the system would not require a physical electric supplement applicable. If the system battery runs out and needs an energy source, a direct charging connection can be established through the USB, "Cigarette lighter", or OBD II port connectors as otherwise described herein. A battery backup may also be used if current battery is depleted.

The child restraint portion may include a memory foam padded region, configured to enhance the comfort of the child seated therewithin. The child restraint portion may include a first expandable section and/or a second expandable section, wherein the first and/or second expandable sections may be inflatable. The expandable sections provide additional support to a child seated therewithin. For example, the child restraint portion may have two inflatable sections, on either side of the child's head, in one non-limiting embodiment, which may be operatively, and optionally independently, inflated or deflated by the user at any point in time during use of the system in order to increase or decrease support of the head of the child. By way of example, should a child fall asleep with its head against the second expandable section, it may be inflated to provide support to the head and neck region, while the first expandable section remains deflated. Because head and neck support are of utmost importance in a child restraint system, particularly during sleep, inflatable head regions of the child restraint system can maintain the head and neck in a supported, and upright position during transportation of the child in the vehicle. Other portions of the child restraint portion may be inflatable as well, including the side walls of the child restraint portion, and the seated portion, in order to provide additional support and comfort to a child and to allow the child restraint system to be customizable and accommodating to children of different sizes and ages, in other non-limiting embodiments. As discussed, memory foam padding may be embedded to ensure full support and comfort; but not limited to a protective cooling protective layer to ensure durability and increase airflow for the comfort car rides and sleep positions, for example. For passengers who require additional room based on their height an inflatable sections are also available where passenger's head and or feet are located. Other portions of the system can be deflated as well to accommodate weight and level of comfort. Inflatable sections can be used to ensure child's head and neck positions are supported and held an upright position.

The child restraint portion may further include an adjustable safety belt or harness, and may be activated, or locked into position to safely secure a child in a vehicle. The safety belt and/or harness may be adjustable to accommodate children of various heights and weights. Sensors may be used to detect when the child is safely secured within the child restraint system/portion, including when a safety belt or harness has been activated or inactivated. Furthermore, via one or more sensors, the child restraint system may provide a signal output if the system detects a child has not been safely removed from the child restraint portion or if the child restraint portion has not been removed from the base portion of the vehicle upon parking the vehicle, or upon opening or closing a vehicle door, for example, a driver's side door. For example, if the vehicle has been placed in a parked position, and the child safety belt or harness is activated, and the driver's side door is opened, an alarm or notification may be provided via the signal output component to alert the driver of the presence of a child in the car.

Movement of the child restraint system and/or the base portion and/or the child restraint portion, independently, can be caused by a drive train that is driven by at least one motor, such as a DC motor. The drive train can comprise a series of gears, a clutch, and a dual ratchet system, all enclosed within a single enclosure, in one example. The system may include a position sensor to detect the position of the system and/or its various components and to output information about the position to a user.

The system may further include a user interface associated with the base portion or the child restraint portion, or remote from the child restraint system and configured to wirelessly received at and/or transmit data to the child restraint system. For example, the user interface device may include a mobile electronic device, a multi-purpose electronic device, a smartphone, a computer, a laptop computer, or a tablet computer. In other embodiments, the user interface device may include features of the vehicle itself, which may be programmed by the manufacturer or programmed by the user of the system. In some instances, the user interface device may be located in the dashboard of the vehicle or on the vehicle steering wheel, or a combination thereof.

In some non-limiting embodiments, the system may be voice activated, and may respond to commands provided by a user. For example, the system may include a microphone for receiving a voice command or input from a user. In another embodiment, the system may be operated through command via a car microphone system, which may be connected to the child restraint system by wired or wireless connection.

The particular position of the child restraint system may be set remotely via a remote controlling apparatus, including, for example, a cellular phone having a cellular phone application, to a position predetermined by the user. In one example, if the child falls asleep before entering the vehicle, the mode and position of the child restraint system may be preset before latching the child into the child restraint system to keep the child asleep in a reclined position upon entering the vehicle. In other embodiments, the cellular phone application can control the position of the child restraint system during use, and while the vehicle is moving.

The system may be latch to existing vehicle car seat latches and seatbelt which will harness the back of the car seat. However, if a car seat is not harnessed or latched correctly, a security alert will be activated and a user of the system will be alerted to correct the safety issue. Child restraining belts on a passenger's body must be adjusted frequently based on child's growth, height and weight. If the belts are too tight or too loose, end user will be alerted via the system to correct such safety issue. Once the vehicle housing the system has been parked, the engine has been turned off, and the driver's door is opened, an alert will be sent as a reminder of the presence of a child in the vehicle. Outer side portions of car seat may include inflatable bags that will deploy when vehicle has been impacted, or where the system senses the system has been in an accident. This will ensure passenger position stability and protection against flying glass when applicable.

Various additional features or utilities may be provided on the system, including cupholders or treys which may be associated with the system, and in some embodiments may be removable there from. In other examples, the additional features may include hanging handles for receiving a tablet or phone for entertainment of the child.

Further details of the child restraint portion may be elucidated by referencing FIG. 1 which includes a view of the child restraint system 100, providing the child retaining portion 102 and the base portion 104. The child retaining portion may include a first and a second expandable section, 106, 108. The system may include additional support regions in a rear head, back, first and second side, seat, and first and second leg support regions. These regions may also be expandable, in some non-limiting embodiments. The system 100 may include one or more sensors 110, as described herein, and may also include a speaker 112 for providing communication with the child and/or for providing music or other auditory output to the child. The child retaining portion 102 may, in a non-limiting embodiment, be equipped with a retaining strap 114 for providing additional support for the head of the child during use of the child restraint system 100. The retaining strap 114 may extend from the first expandable section 106 to the second expandable section 108, and across the forehead of the child during use of the system 100. The retaining strap 114, may be removably or permanently attached to one expandable section and may stretch across to the other expandable section and be secured thereon by hook and loop fastening system or another fastening system known in the art. In other embodiments, the retaining strap 114 may be permanently affixed to the first and second expandable sections and may include a stretch fabric to allow placement and removal of the child's head from beneath the strap 114. The system may further include built in voice services 128 in the form of microphone and/or speaker to respond to commands, supported by WIFI. The speaker volume of the system may be pre-set to not exceed a predetermined decibel to avoid causing hearing damage to the child in the seat. The sensors 110 indicated in the FIG. may include built in motion sensors to monitor when motion is or is not felt during a timeframe. The sensors notify the user that the child is at a still position for an "x" length of time. It will also recommend adjusting to the pre-set sleep angle position. In certain instances detecting non-movement and other characteristics (oxygen level or breathing rate) of the child can help detect SIDS and prevent a fatal death of a child while in the car seat of the system described herein.

Figure 3:
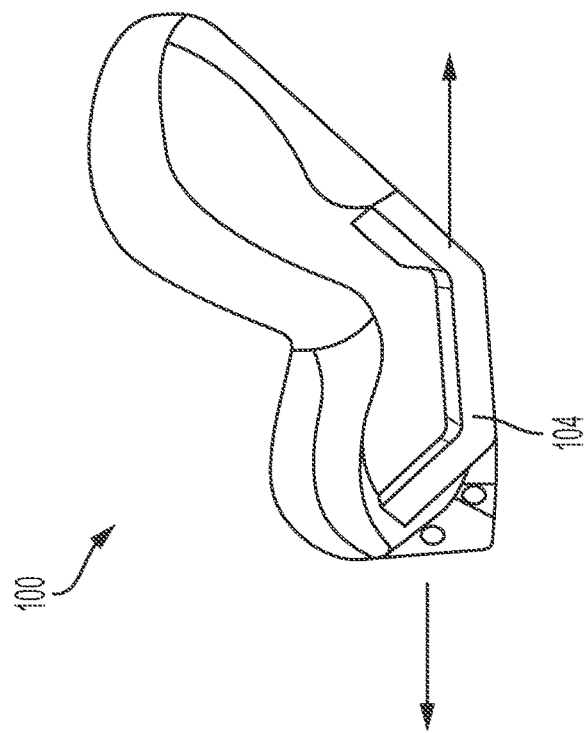
FIG. 3 is a side view of the embodiment of the adjustable child restraint system shown in FIG. 1 with arrows demonstrating the adjustability of the horizontal base support.

FIGS. 2 and 3 provide side views of the child restraint system 100, demonstrating examples of the adjustability of the child retaining portion 102 (as shown in FIG. 2) and the base portion 104 (as shown in FIG. 3).

FIG. 4 provides a schematic view of the system 100 including a remote controlling apparatus 124, such as a cellular phone, which may include a cellular application 125 for controlling the system 100, by wired, or a wireless connection 126. The schematic of FIG. 4 further includes a controller 118 connected to a signal output component 116, one or more sensors 110, a microphone 120, and a power source 122 for powering the system 100.

In an additional embodiment there is provided, a computing device to listen to users of the system of claim 1 above, comprising a microphone to receive end user voice inputs and commands, wherein the end user may program the word or phrase for system interaction, a computational implemented database to store all artificial intelligent data gathered for commands, a computational programmed/modeled query for each desired user(s) input(s) to provide desired command output(s), a computational communication model to receive user(s) commands, deliver and transmit the data to the implemented database or computing device, and respond to voice input commands provided by the user(s), and a computational artificial intelligence module to store, learn and adjust to end user voices/commands, and sleeping, breathing, and movement patterns of a child retained in the child retaining portion of the seat. The computing device may be integrated into or adjacent to, or associated with the system embodiments 100 described herein. In a further embodiment, the computing device may include the processor.

It should be borne in mind that all patents, patent Applications, patent publications, technical publications, scientific publications, and other references referenced herein are hereby incorporated by reference in this application in order to more fully describe the state of the art to which the present invention pertains.

Reference to particular buffers, media, reagents, cells, culture conditions and the like, or to some subclass of same, is not intended to be limiting, but should be read to include all such related materials that one of ordinary skill in the art would recognize as being of interest or value in the particular context in which that discussion is presented. For example, it is often possible to substitute one buffer system or culture medium for another, such that a different but known way is used to achieve the same goals as those to which the use of a suggested method, material or composition is directed.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. An adjustable child restraint system, comprising:
a base portion;
a child retaining portion;
a sensor;
a signal output component;
a microphone;
a controller operatively connected to the base portion and/or the child retaining portion, the controller for operating movement of the base portion and/or the child retaining portion, wherein the controller is configured to receive input from the sensor and provide an output through the signal output component based on the input received;
wherein the child retaining portion comprises a first expandable section and a second expandable section to operatively expand to support a head and neck of a child seated there within, and wherein the base portion is adjustable in a forward and backward motion.

2. A computing device to listen to users of the system of claim 1 above, comprising:
the microphone to receive end user voice inputs and commands, wherein the end user may program words or phrases for system interaction;
a computational implemented database to store all artificial intelligent data gathered for commands;
a computational programmed/modeled query for each desired users inputs to provide desired command outputs;
a computational communication model to receive users commands, deliver and transmit the data to the implemented database or computing device, and respond to voice input commands provided by the users; and
a computational artificial intelligence module to store, learn and adjust to end user voices/commands, and sleeping, breathing, and movement patterns of a child retained in the child retaining portion of the child restraint system.

3. The adjustable child restraint system of claim 1, further comprising a retaining strap extending from the first expandable section to the second expandable section to retain a head of the child in an upright position.

4. The adjustable child restraint system of claim 1, wherein the base portion is tiltably adjustable.

5. The adjustable child restraint system of claim 1, wherein the first and/or second expandable sections are inflatable.

6. The adjustable child restraint system of claim 5 associated with a cellular phone comprising a cellular application for controlling the system, wherein controlling the system includes providing inputs to the controller to adjust the child restraint system.

7. The adjustable child restraint system of claim 6, wherein the inputs provided by the cellular phone comprise: tilt adjustment of the base portion or the child retaining portion, activation of the signal output component to provide a reading based on sensor input, and inflating or deflating of the first and/or second expandable sections.

8. An adjustable child restraint system, comprising:
a base portion;
a child retaining portion;
a sensor;
a signal output component;
a microphone;
a controller operatively connected to the base portion and/or the child retaining portion, the controller for operating movement of the base portion and/or the child retaining portion, wherein the controller is configured to receive input from the sensor and provide an output through the signal output component based on the input received;
wherein the child retaining portion comprises a first expandable section and a second expandable section to operatively expand to support a head and neck of a child seated there within, wherein the child retaining portion is adjustable in a forward and backward motion.

9. The adjustable child restraint system of claim 8, wherein the first and/or second expandable sections are inflatable.

10. The adjustable child restraint system of claim 8, further comprising a retaining strap extending from the first expandable section to the second expandable section to retain a head of the child in an upright position.

11. The adjustable child restraint system of claim 8, wherein the base portion is tiltably adjustable.

12. An adjustable child restraint system, comprising:
a base portion;
a child retaining portion comprising a first expandable section and a second expandable section to operatively expand to support a head and neck of a child seated there within;
a sensor;
a controller operatively connected to the base portion and/or the child retaining portion, the controller for operating movement of the base portion and/or the child retaining portion; and
a computing device to listen to users of the system, comprising:
a microphone to receive commands and voice inputs from users of the system;
a computational programmed/modeled query for each desired user input to provide desired command output;
a computational communication model to receive user commands, deliver and transmit the data to an implemented database or computing device, and respond to voice input commands provided by the user; and a computational artificial intelligence module to detect, and optionally, store user voices/commands, sleeping, breathing, or movement patterns, or a combination thereof, of a child retained in the child retaining portion.

* * * * *